(12) United States Patent
Motegi et al.

(10) Patent No.: US 8,725,149 B2
(45) Date of Patent: May 13, 2014

(54) HANDOVER METHOD AND RADIO BASE STATION

(75) Inventors: Masayuki Motegi, Yokohama (JP);
Yasuhiro Kato, Yokohama (JP);
Yoshitsugu Shimazu, Kawasaki (JP);
Wuri Andarmawanti Hapsari, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 276 days.

(21) Appl. No.: 12/532,049

(22) PCT Filed: Mar. 7, 2008

(86) PCT No.: PCT/JP2008/054126
§ 371 (c)(1),
(2), (4) Date: Nov. 5, 2009

(87) PCT Pub. No.: WO2008/114625
PCT Pub. Date: Sep. 25, 2008

(65) Prior Publication Data
US 2010/0062774 A1    Mar. 11, 2010

(30) Foreign Application Priority Data
Mar. 19, 2007  (JP) .............................. P2007-071687

(51) Int. Cl.
*H04W 36/00* (2009.01)
*H04W 4/00* (2009.01)
(52) U.S. Cl.
USPC ........... 455/436; 455/437; 455/438; 455/439; 455/442; 455/443; 370/331

(58) Field of Classification Search
USPC .................... 455/436–444; 370/331
See application file for complete search history.

(56) References Cited

U.S. PATENT DOCUMENTS

| | | | | |
|---|---|---|---|---|
| 2001/0053138 A1* | 12/2001 | Pillai et al. | ..................... | 370/331 |
| 2006/0007862 A1* | 1/2006 | Sayeedi et al. | ................ | 370/235 |
| 2006/0109818 A1* | 5/2006 | Ramanna et al. | ............. | 370/331 |
| 2007/0115885 A1* | 5/2007 | Singh et al. | ..................... | 370/331 |
| 2009/0061876 A1* | 3/2009 | Ho et al. | ....................... | 455/436 |

OTHER PUBLICATIONS

3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", Sep. 2006.*

(Continued)

*Primary Examiner* — Jinsong Hu
*Assistant Examiner* — Dung Hong
(74) *Attorney, Agent, or Firm* — Osha Liang LLP

(57) ABSTRACT

A handover method according to the present invention includes the steps of: forwarding, at a handover-source radio base station (eNB), user data (A) for a mobile station (UE) to a handover-target radio base station (eNB) when it is determined that a handover processing is to be performed, the user data (A) being stored in the handover-source radio base station (eNB); activating, at the handover-target radio base station, a predetermined timer when transmitting a path switch request to a path control apparatus, and storing second user data for the mobile station received from the path control apparatus until the predetermined timer expires; and forwarding, at the handover-target radio base station, the stored second user data to the mobile station after the predetermined timer expires.

4 Claims, 6 Drawing Sheets

(56) References Cited

OTHER PUBLICATIONS

International Search Report w/translation from PCT/JP2008/054126 dated Apr. 1, 2008 (5 pages).
Written Opinion from PCT/JP2008/054126 dated Apr. 1, 2008 (4 pages).
3GPP TR 25.912 V7.1.0; "Technical Specification Group Radio Access Network, Feasibility study for evolved Universal Terrestrial Radio Access (UTRA) and Universal Terrestrial Radio Access Network (UTRAN) (Release 7)"; Sep. 2006 (57 pages).
3GPP TSG-RAN WG2, R2-06XXXX; "Summary of email discussion on downlink reordering during LTE"; NEC (email rapporteur); RAN2 LTE Teleconference, Dec. 13, 2007 (10 pages).
3GPP TS 25.323 V6.7.0; "Packet Data Convergence Protocol (PDCP) specification"; Sep. 2006 (40 pages).
Japanese Office Action for Japanese Application No. 2007-071687, mailed Jul. 5, 2011, and English translation thereof, 5 pages.
Yamashita et al., "Packet Transfer between Base Stations in Handover for Mobile Packet Communication System-Evaluation of Loss, Delay and Reordering," Institute of Electronics, Information, and Communication Engineers, Mar. 3, 2006 and English translation thereof, 3 pages.

* cited by examiner

HANDOVER METHOD AND RADIO BASE STATION

TECHNICAL FIELD

The present invention relates to a handover method in which a mobile station performs processing for handover from a handover-source radio base station to a handover-target radio base station. The present invention also relates to a radio base station used in a mobile communication system in which a mobile station is configured to perform handover processing.

BACKGROUND ART

In a mobile communication system employing the IMT-2000 (International Mobile Telecommunication-2000) scheme, the following is defined for lossless handover implementation in a case where a mobile station UE (User Equipment) performs handover (SRNS relocation) between radio base stations NodeB connected to two respective radio network controllers (RNC) connected under control of the same switching center SGSN (Serving GPRS Support Node). Specifically, firstly, protocol status synchronization (PDCP sequence number synchronization) is first performed between a handover-target radio network controller and the mobile station UE by using a Layer-2 sub-layer (e.g., PDCP: Packet Data Convergence Protocol). Then, a handover-source radio network controller forwards not-forwarded PDCP-PDUs (Protocol Data Units) which have been not forwarded to the mobile station UE yet, to the handover-target radio network controller.

Here, after the handover-source radio network controller completes forwarding of the PDCP-PDUs accumulated therein, the handover-target radio network controller requests the switching center SGSN to open a downlink U-plane.

Specifically, as FIG. 1 shows, in the IMT-2000 mobile communication system, upon start of the SRNS relocation, a handover-source radio network controller (Source RNC) transmits a relocation start message (Relocation Request) to a switching center SGSN by using RANAP (Radio Access Network Application Part) in Step S1. The transmission of the relocation start message serves as a trigger to stop forwarding of user data to the handover-source radio network controller (Source RNC).

In Step S2, the mobile station UE performs processing for handover from the handover-source radio network controller to a handover-target radio network controller (Target RNC). Then in Step S3, the handover-source radio network controller forwards the not-forwarded PDCP-PDUs to the handover-target radio network controller.

After completion of the PDCP-PDU forwarding, in Step S4, the handover-target radio network controller transmits a relocation completion command (Relocation Request Acknowledge) to the switching center SGSN.

The switching center SGSN is configured to open the U-plane between the switching center SGSN and the handover-target radio network controller by being triggered by the transmission of the relocation completion command. Accordingly, there has been a problem of a long interruption time in the handover processing.

On the other hand, there is a mobile communication system employing the LTE (Long Term Evolution) scheme, the 3GPP standardization of which is underway. What is discussed as to the LTE mobile communication system is that, when the mobile station UE performs handover processing, a handover-source radio base station (Source eNB) forwards stored user data for the mobile station UE to a handover-target radio base station (Target eNB), as FIG. 2 shows.

Non-patent Document 1: 3GPP TS25.323

DISCLOSURE OF THE INVENTION

However, the LTE mobile communication system has the following problem. Since the LTE mobile communication system is expected to realize high performance, a large amount of data might accumulate in the handover-source radio base station eNB, if a core node (SAE Gateway) does not switch the path for forwarding user data for the mobile station until user data forwarding to the handover-target radio base station eNB is completed. Therefore, this accumulation might largely increase the interruption time and thus affect the performance of the upper layer.

As a countermeasure against the above problem, the core node SAE Gateway may switch the path for forwarding user data B during forwarding of user data A from the handover-source radio base station eNB to the handover-target radio base station eNB. However, such a countermeasure causes the following problem. Specifically, the user data A and the user data B coexist in the handover-target radio base station eNB, the user data A being forwarded from the core node SAE Gateway to the handover-target radio base station eNB through the handover-source radio base station eNB, the user data B being forwarded from the SAE Gateway to the handover-target radio base station eNB after the switching of the forwarding path. Consequently, the order of forwarding the user data to the mobile station UE is lost, and the characteristics of the upper layer (e.g., TCP: Transmission Control Protocol) may be degraded.

The present invention has been made in consideration of the above problems and has an objective to provide a handover method and a radio base station by which user data can be forwarded to the mobile station UE in correct order in handover processing by causing the handover-target radio base station eNB to temporarily store user data from the core node SAE Gateway and to preferentially forward user data transmitted from the handover-source radio base station eNB to the mobile station UE.

A first aspect of the present invention is summarized as a handover method in which a mobile station performs processing for handover from a handover-source radio base station to a handover-target radio base station, the handover method including the steps of: forwarding, at the handover-source radio base station, first user data for the mobile station to the handover-target radio base station when it is determined that the handover processing is to be performed, the first user data being stored in the handover-source radio base station; forwarding, at the handover-target radio base station, the first user data to the mobile station; activating, at the handover-target radio base station, a predetermined timer when transmitting a path switch request to a path control apparatus to request switch of a path for forwarding user data, and storing second user data for the mobile station received from the path control apparatus until the predetermined timer expires; and forwarding, at the handover-target radio base station, the stored second user data to the mobile station after the predetermined timer expires.

In the first aspect, a U-plane tunnel established between the handover-source radio base station and the handover-target radio base station and used for user data forwarding can be released after the predetermined timer expires.

In the first aspect, the predetermined timer can be set individually for each QoS of the user data.

A second aspect of the present invention is summarized as a radio base station used in a mobile communication system in which a mobile station is configured to perform handover processing, the radio base station being configured to: receive first user data for the mobile station from a handover-source radio base station when it is determined that the handover processing is to be performed, the first user data being stored in the handover-source radio base station; forward the first user data to the mobile station; activate a predetermined timer when transmitting a path switch request to a path control apparatus to request switch of a path for forwarding user data, and store second user data for the mobile station received from the path control apparatus until the predetermined timer expires; and forward the stored second user data to the mobile station after the predetermined timer expires.

In the second aspect, a U-plane tunnel established with the handover-source radio base station and used for user data forwarding can be released after the predetermined timer expires.

In the second aspect, the predetermined timer can be set individually for each QoS of the user data.

As described above, the present invention can provide the handover method and the radio base station by which user data can be forwarded to the mobile station UE in correct order in handover processing by causing the handover-target radio base station eNB to temporarily store user data from the core node SAE Gateway and to preferentially forward user data transmitted from the handover-source radio base station eNB to the mobile station UE.

BEST MODE FOR CARRYING OUT THE INVENTION

Configuration of a Mobile Communication System According to a First Embodiment of the Present Invention With reference to FIGS. 3 and 4, the configuration of a mobile communication system according to a first embodiment of the present invention will be described.

The mobile communication system according to the embodiment relates to a communication technique employed in handover processing, and particularly, to a technique in which, upon data forwarding, a handover-target radio base station eNB temporarily buffers user data B (second user data) for a mobile station UE transmitted by a core node SAE (System Architecture Evolution) Gateway.

Figure 1:
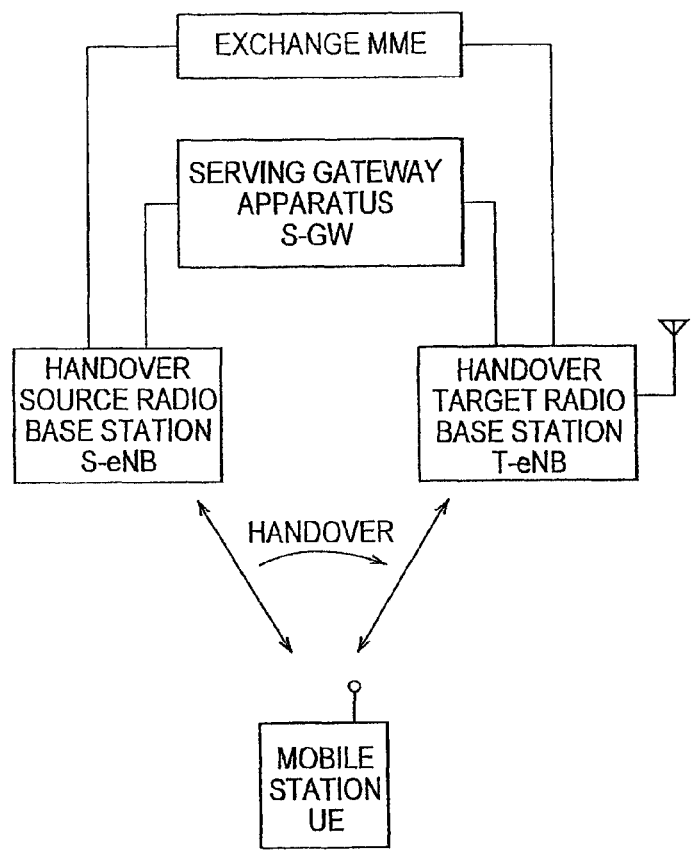
FIG. 1 is a diagram illustrating an operation of a mobile communication system employing the IMT-2000 scheme.
Figure 2:
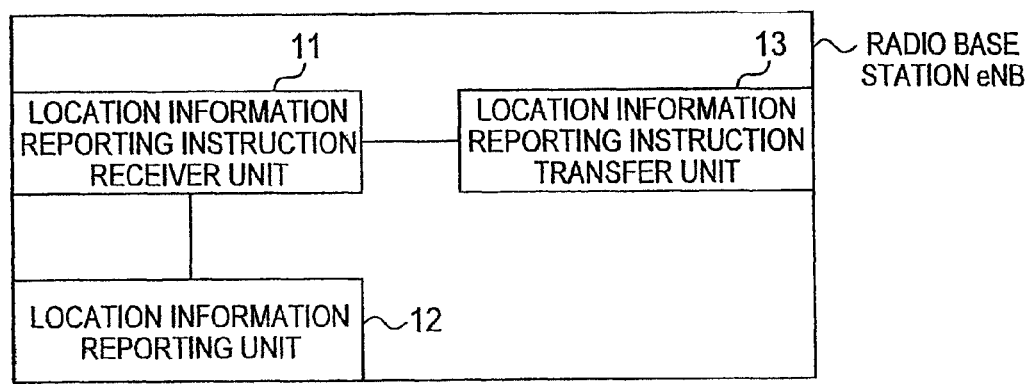
FIG. 2 is a diagram illustrating an operation of a mobile communication system employing the LTE scheme.
Figure 3:
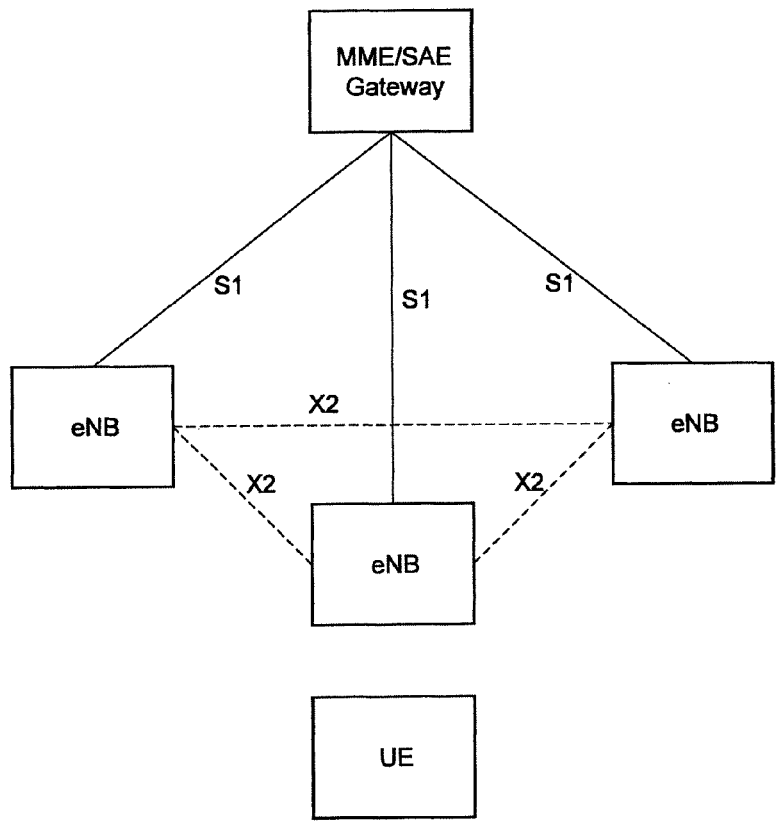
FIG. 3 is a diagram showing the overall configuration of a mobile communication system according to a first embodiment of the present invention.

As FIG. 3 shows, a mobile communication system including LTE/SAE architecture, the 3GPP standardization of which is underway, is described as an example in the embodiment. However, the present invention is not limited to such a mobile communication system, and is also applicable to a mobile communication system including other kinds of architecture.

As FIG. 3 shows, a radio access network (RAN) includes multiple eNBs and a path control apparatus (core node) MME/SAE Gateway connected with the eNBs.

Here, the MME (Mobility Management Entity) is a node that processes control signals, whereas the SAE Gateway is a node that processes user data.

As FIG. 3 shows, X2 interfaces are defined between the radio base stations eNB. An S1 interface is defined between each radio base station eNB and the path control apparatus MME/SAE Gateway.

In particular, a U-plane tunnel (GTP tunnel) is set up on the X2 interface. Through the U-plane tunnel, user data A (first user data) is forwarded from a handover-source radio base station eNB to a handover-target radio base station eNB, in the handover processing by the mobile station UE.

Note that the S1 interface and the X2 interface both can handle transmission of control plane (C-plane) data and of user plane (U-plane) data.

Figure 4:
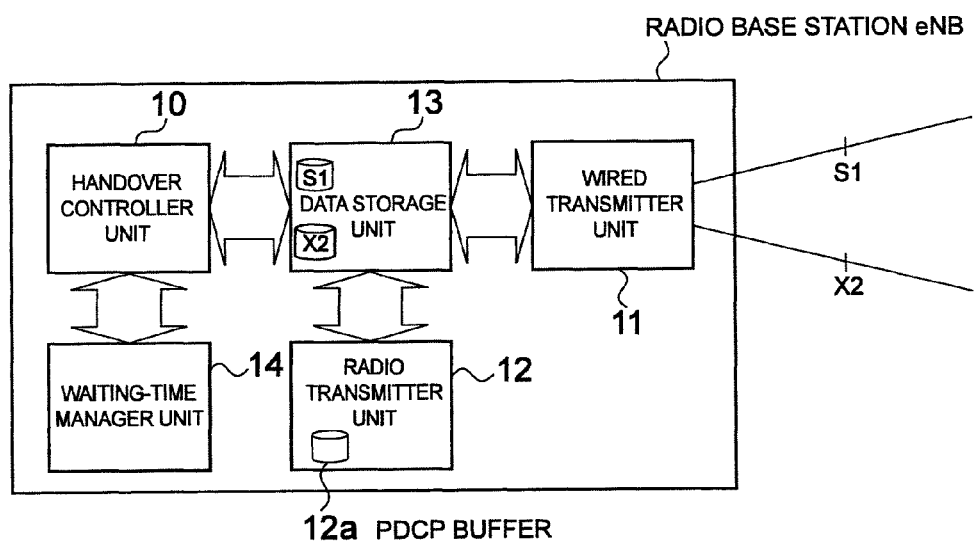
FIG. 4 is a functional block diagram of a radio base station according to the first embodiment of the present invention.

As FIG. 4 shows, the radio base station eNB according to the embodiment includes a handover controller unit 10, a wired transmitter unit 11, a radio transmitter unit 12, a data storage unit 13, and a waiting-time manager unit 14.

The handover controller unit 10 is configured to perform control between the radio base stations eNB and between each radio base station eNB and the path control apparatus MME/SAE Gateway when the mobile station UE performs handover processing.

The wired transmitter unit 11 is configured to transmit and receive user data to and from the path control apparatus MME/SAE Gateway through the S1 interface, and to and from a different radio base station eNB through the X2 interface.

The wired transmitter unit 11 is configured to store the user data A (first user data) transmitted from the different radio base station eNB (handover-source radio base station Source eNB) through the X2 interface, in an X2 interface buffer in the data storage unit 13.

Specifically, the wired transmitter unit 11 is configured as follows. When the handover processing by the mobile station UE is decided to be performed, the wired transmitter unit 11, instructed by the handover controller 10, sets up a U-plane tunnel (GTP tunnel) between the own radio base station eNB and the handover-source radio base station eNB. Then, the wired transmitter unit 11 receives the user data A (first user data) for the mobile station stored in the handover-source radio base station eNB, from the handover-source radio base station eNB through the set-up U-plane tunnel (GTP tunnel), and stores the received user data A in the X2 interface buffer in the data storage unit 13.

Here, the number of the U-plane tunnel (GTP tunnel) used to forward the user data A (first user data) from the handover-source radio base station eNB to the handover-target radio base station eNB may be only one, or may be more than one, each for the QoS (Quality Of Service) of the user data.

The user data A (first user data) stored in the X2-interface buffer is forwarded to a PDCP buffer 12a when needed.

In addition, the wired transmitter unit 11 is configured to store the user data B (second user data) transmitted through the S1 interface from the path control apparatus MME/SAE Gateway, in an S1-interface buffer in the data storage unit 13.

Specifically, the wired transmitter unit 13 is configured to temporarily store the user data B (second user data) for the mobile station UE transmitted from the path control apparatus MME/SAE Gateway, in the S1-interface buffer in the data storage unit 13, for a predetermined period (waiting time $T_{reordering}$) from an occurrence of a predetermined trigger, namely, until a predetermined timer expires.

In other words, the wired transmitter unit 11 is configured to start the temporary storage of the user data B (second user data) for the mobile station UE transmitted from the path control apparatus MME/SAE Gateway, in the S1-interface buffer in the data storage unit 13, upon occurrence of the predetermined trigger.

Here, conceivable actions as the predetermined trigger include, for example, transmitting, at the handover controller unit 10 of the radio base station eNB, a path switch request to the path control apparatus MME/SAE Gateway to request switching of the path for user data forwarding; or specifically, transmitting a "Path Switch" message being a setup request for setting up the U-plane tunnel (GTP tunnel) between the radio base station eNB and the path control apparatus MME/SAE Gateway, or transmitting a "Handover Complete" message being a setup request for setting up an SAE access bearer between the radio base station eNB and the path control apparatus MME/SAE Gateway.

Note that the user data B (second user data) stored in the S1-interface buffer is forwarded to the PDCP buffer 12a after a lapse of a predetermined time since the occurrence of the predetermined trigger.

Further, the tunnel (U-plane tunnel, GTP tunnel) established, for user data forwarding, between the handover-source radio base station eNB and the handover-target radio base station eNB is released after a lapse of the predetermined period (waiting time $T_{reordering}$) since the occurrence of the predetermined trigger, namely, when the predetermined timer has expired.

The radio transmitter unit 12 is configured to forward the user data accumulated in the PDCP buffer 12a to the mobile station UE through a radio link, at a scheduled occasion for transmission.

The waiting-time manager unit 14 is configured to manage a predetermined-time (waiting time $T_{reordering}$) timer (predetermined timer) when the mobile station UE performs handover processing. The predetermined time indicates a time during which to buffer the user data B (second user data) for the mobile station UE.

Note that the waiting-time manager unit 14 may be configured to set the predetermined-time (waiting time $T_{reordering}$) timer (predetermined timer) individually for each QoS (such as a priority based on Diffserv) of the user data.

Operation of the Mobile Communication System According to the First Embodiment of the Present Invention With reference to FIGS. 5 to 7, an operation of the mobile communication system according to the first embodiment of the present invention will be described.

First, referring to FIG. 5, a description will be given of a first example of the operation in which the mobile station UE performs handover processing in the mobile communication system according to the first embodiment of the present invention.

Figure 5:
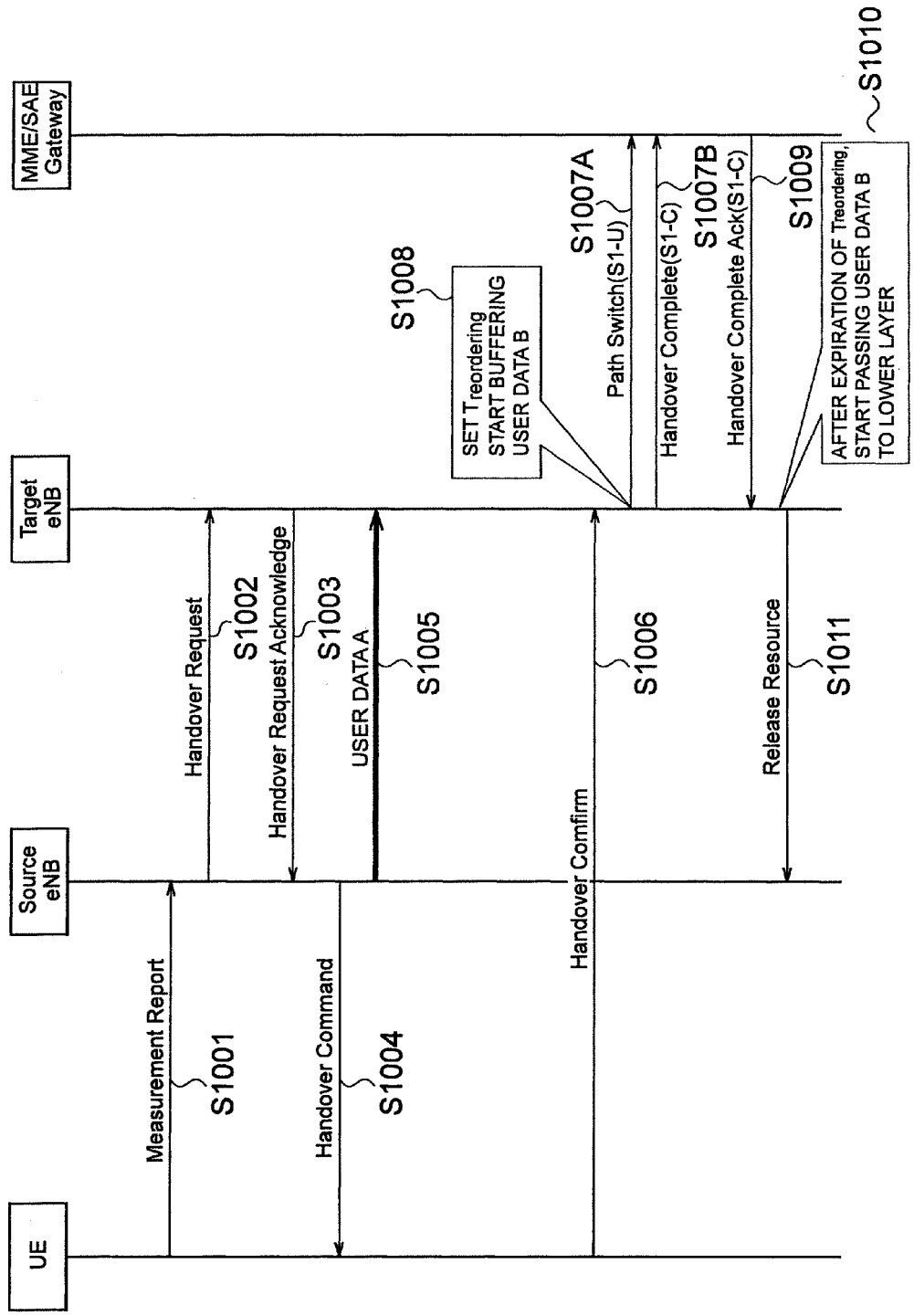
FIG. 5 is a flowchart showing an operation of the radio base station according to the first embodiment of the present invention.

As shown in FIG. 5, in Step S1001, by an instruction from the radio base station Source eNB to which the mobile station UE is being connected, or by the judgment of the mobile station UE itself, the mobile station UE measures the quality of the radio communication between the mobile station UE and (a cell of) the radio base station Source eNB, and transmits a "Measurement Report" message to the radio base station Source eNB (cell) when the radio communication quality measured is lower than a predetermined threshold.

In Step S1002, the radio base station Source eNB having received the "Measurement Report" message transmits a "Handover Request" message through the X2 interface to a radio base station Target eNB that, for example, has the best radio communication quality among the radio communication qualities reported by the mobile station UE.

In Step S1003, the radio base station Target eNB having received the "Handover Request" message and now being the target of the handover transmits a "Handover Request Acknowledge" message to the handover-source radio base station Source eNB if able to accept the mobile station UE.

In Step S1004, the handover-source radio base station Source eNB having received the "Handover Request Acknowledge" message transmits a "Handover Command" message to the mobile station UE to instruct to perform handover processing.

In Step S1005, the handover-source radio base station Source eNB starts forwarding the stored user data A (first user data) for the mobile station UE, to the handover-target radio base station Target eNB.

Here, the handover-target radio base station Target eNB assigns the mobile station UE, having received the "Handover Command" message, resources for transmitting uplink signals. Then in Step S1006, the mobile station UE transmits a "Handover Confirm" message to the handover-target radio base station Target eNB.

In Step S1007A, the handover-target radio base station Target eNB having received the "Handover Confirm" message transmits a "Path Switch" message to the path control apparatus MME/SAE Gateway by using GTP-u (S1-U) on the S1 interface. Here, the "Path Switch" message is a setup request requesting switching of a path for forwarding user data, from the handover-source radio base station Source eNB to the handover-target radio base station Target eNB.

Additionally, in parallel with Step S1007A, in Step S1007B, the handover-target radio base station Target eNB notifies the path control apparatus MME/SAE Gateway of a "Handover Complete" message by using signaling (S1-C) on the S1 interface, in order to set up a SAE access bearer between the handover-target radio base station Target eNB and the path control apparatus MME/SAE Gateway.

In Step S1008, triggered by Step S1007A, namely, triggered by the transmission of the "Path Switch" message to the path control apparatus MME/SAE Gateway, the handover-target radio base station Target eNB activates the waiting-time ($T_{reordering}$) timer (predetermined timer) for defining a buffering time.

Here, the handover-target radio base station Target eNB buffers the user data B (second user data) received from the path control apparatus MME/SAE Gateway during the activation of the waiting-time ($T_{reordering}$) timer.

Note that the path control apparatus MME/SAE Gateway switches the target for forwarding the user data B (second user data) for the mobile station UE, from the handover-source radio base station Source eNB to the handover-target radio base station Target eNB, when having received the "Path Switch" message transmitted from the handover-target radio base station Target eNB.

Alternatively, the path control apparatus MME/SAE Gateway may be configured to switch the target for forwarding the user data B (second user data) for the mobile station UE from the handover-source radio base station Source eNB to the handover-target radio base station Target eNB, when having received a "Handover Complete" message transmitted from the handover-target radio base station Target eNB.

In Step S1009, the path control apparatus MME/SAE Gateway transmits the "Handover Complete Ack" message to the handover-target radio base station Target eNB by using signaling (S1-C) on the S1 interface, to notify of completion of the SAE access bearer setup.

As described above, once receiving the "Path Switch" transmitted from the handover-target radio base station Target eNB, the path control apparatus MME/SAE Gateway possibly transmits the user data B (second user data) for the mobile station UE to the handover-target radio base station Target eNB. Accordingly, triggered by the transmission of the "Path Switch" message to the path control apparatus MME/SAE Gateway, the handover-target radio base station Target eNB needs to transition to a state capable of temporarily buffering the user data B (second user data) from the path control apparatus MME/SAE Gateway.

Thereafter, triggered by expiration of the activated waiting time ($T_{reordering}$) timer, the handover-target radio base station Target eNB stops the buffering of the user data B (second user data) in the S1-interface buffer, and forwards the user data B (second user data) stored in the S1-interface buffer to the PDCP buffer. The handover-target radio base station Target eNB then starts forwarding the user data stored in the PDCP buffer to the mobile station UE through a radio interface.

Moreover, in Step S1011, triggered by the expiration of the activated waiting time ($T_{reordering}$) timer, the handover-target radio base station Target eNB transmits a "Release Resource" message to the handover-source radio base station Source eNB to request a release of the U-plane tunnel set up on the X2 interface.

Second, referring to FIG. 6, a description will be given of a second example of the operation in which the mobile station UE performs handover processing in the mobile communication system according to the first embodiment of the present invention.

The second example is the same as the first example described above, except for the operation in Step S2008.

Figure 6:
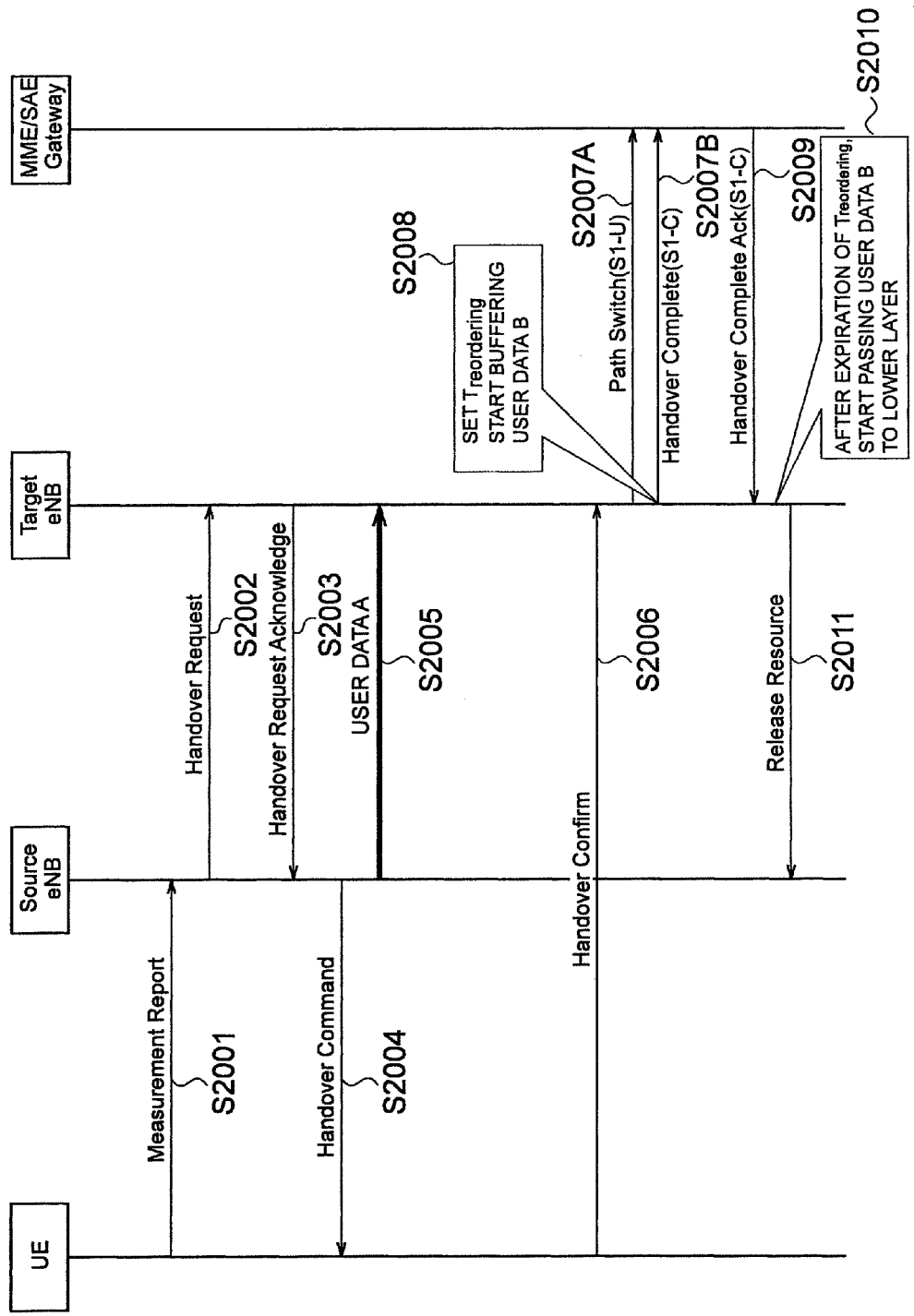
FIG. 6 is a sequence diagram showing an operation of the mobile communication system according to the first embodiment of the present invention.

In the second example, as shown in FIG. 6, triggered by Step S2007B, namely, triggered by transmission of the "Handover Complete" message to the path control apparatus MME/SAE Gateway, in Step S2008 the handover-target radio base station Target eNB activates the waiting-time ($T_{reordering}$) timer (predetermined timer) defining a buffering time.

Here, the handover-target radio base station Target eNB buffers the user data B (second user data) received from the path control apparatus MME/SAE Gateway during the activation of the waiting-time ($T_{reordering}$) timer.

As described above, once receiving the "Handover Complete" transmitted from the handover-target radio base station Target eNB, the path control apparatus MME/SAE Gateway possibly transmits the user data B (second user data) for the mobile station UE to the handover-target radio base station Target eNB. Accordingly, triggered by the transmission of the "Handover Complete" message to the path control apparatus MME/SAE Gateway, the handover-target radio base station Target eNB needs to transition to a state capable of temporarily buffering the user data B (second user data) from the path control apparatus MME/SAE Gateway.

Third, referring to FIG. 7, a description will be given of a third example of the operation in which the mobile station UE performs handover processing in the mobile communication system according to the first embodiment of the present invention.

The third example is the same as the first example described above, except for the operation from Steps S3007A to S3009.

Figure 7:
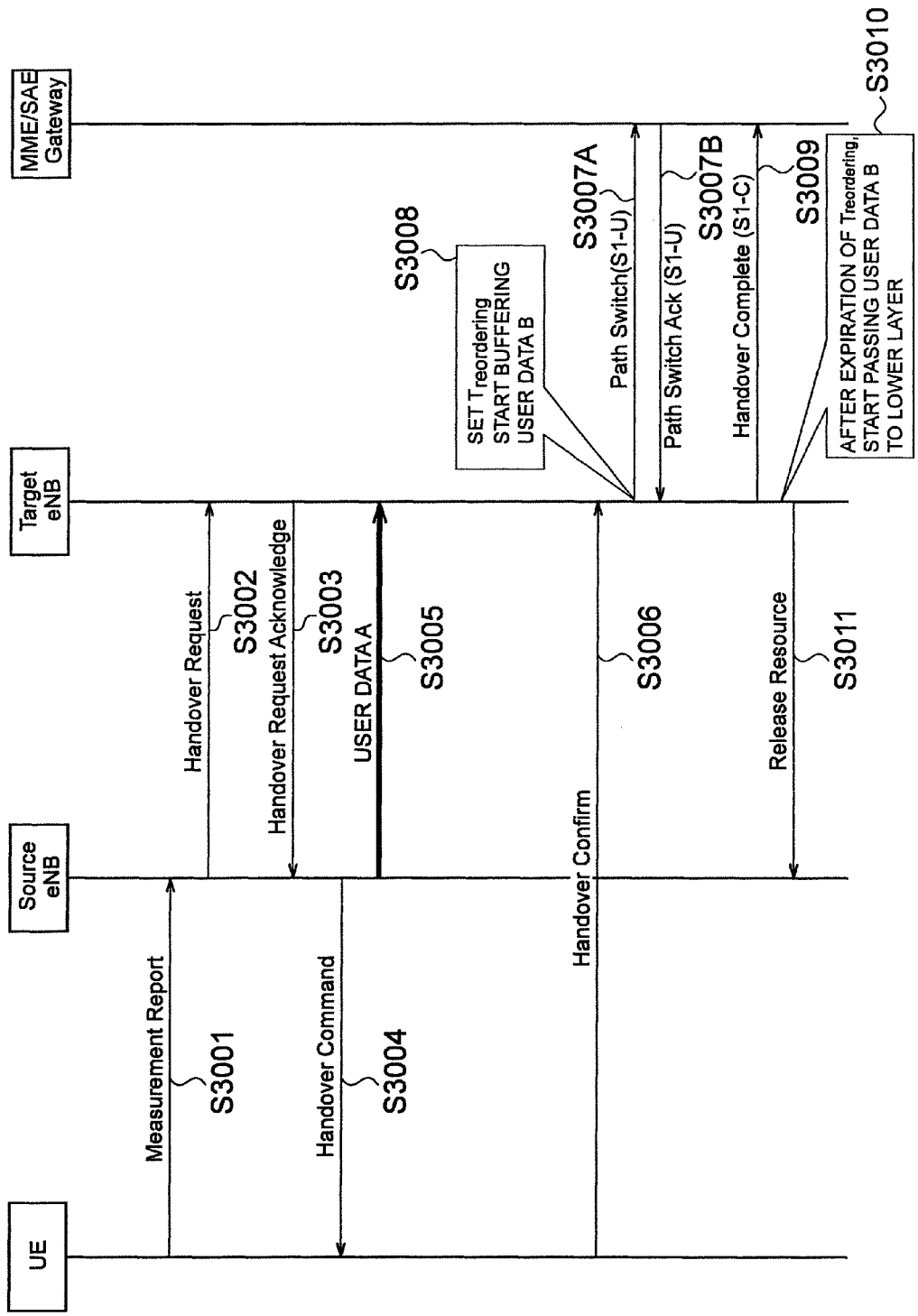
FIG. 7 is a sequence diagram showing an operation of the mobile communication system according to the first embodiment of the present invention.

In the third example, as shown in FIG. 7, in Step S3007A, the handover-target radio base station Target eNB having received the "Handover Confirm" message transmits a "Path Switch" message to the path control apparatus MME/SAE Gateway by using GTP-u (S1-U) on the S1 interface.

In Step S3007B, the path control apparatus MME/SAE Gateway having received the "Path Switch" message transmits a "Path Switch Ack" message to the handover-target radio base station Target eNB by using GTP-u (S1-U) on the S1 interface.

Here, in Step S3008, triggered by Step S3007A or S3007B, namely, triggered by the transmission of the "Path Switch" message to the path control apparatus MME/SAE Gateway, or by the receipt of the "Path Switch Ack" message from the path control apparatus MME/SAE Gateway, the handover-target radio base station Target eNB activates the waiting-time ($T_{reordering}$) timer (predetermined timer) for defining a buffering time.

In Step S3009, the handover-target radio base station Target eNB having received the "Path Switch Ack" message notifies the path control apparatus MME/SAE Gateway of a "Handover Complete" message by using signaling (S1-C) on the S1 interface.

Note that the path control apparatus MME/SAE Gateway switches the target for forwarding the user data B (second user data) for the mobile station UE, from the handover-source radio base station Source eNB to the handover-target radio base station Target eNB, when having received the "Path Switch" message from the handover-target radio base station Target eNB.

Alternatively, the path control apparatus MME/SAE Gateway may be configured to switch the target for forwarding the user data B (second user data) for the mobile station UE from the handover-source radio base station Source eNB to the handover-target radio base station Target eNB, when having transmitted the "Path Switch Ack" message to the handover-target radio base station Target eNB.

As described above, once receiving the "Path Switch" message transmitted from the handover-target radio base station Target eNB, or transmitting the "Path Switch Ack" message, the path control apparatus MME/SAE Gateway possibly transmits the user data B (second user data) for the mobile station UE to the handover-target radio base station Target eNB. Accordingly, triggered by the transmission of the "Path Switch" message to the path control apparatus MME/SAE Gateway, or by the receipt of the "Path Switch Ack" message, the handover-target radio base station Target eNB needs to transition to a state capable of temporarily buffering the user data B (second user data) from the path control apparatus MME/SAE Gateway.

Fourth, referring to FIG. 8, a description will be given of an operation of the handover-target radio base station eNB, performed when the mobile station UE performs handover processing in the mobile communication system according to the first embodiment of the present invention.

Figure 8:
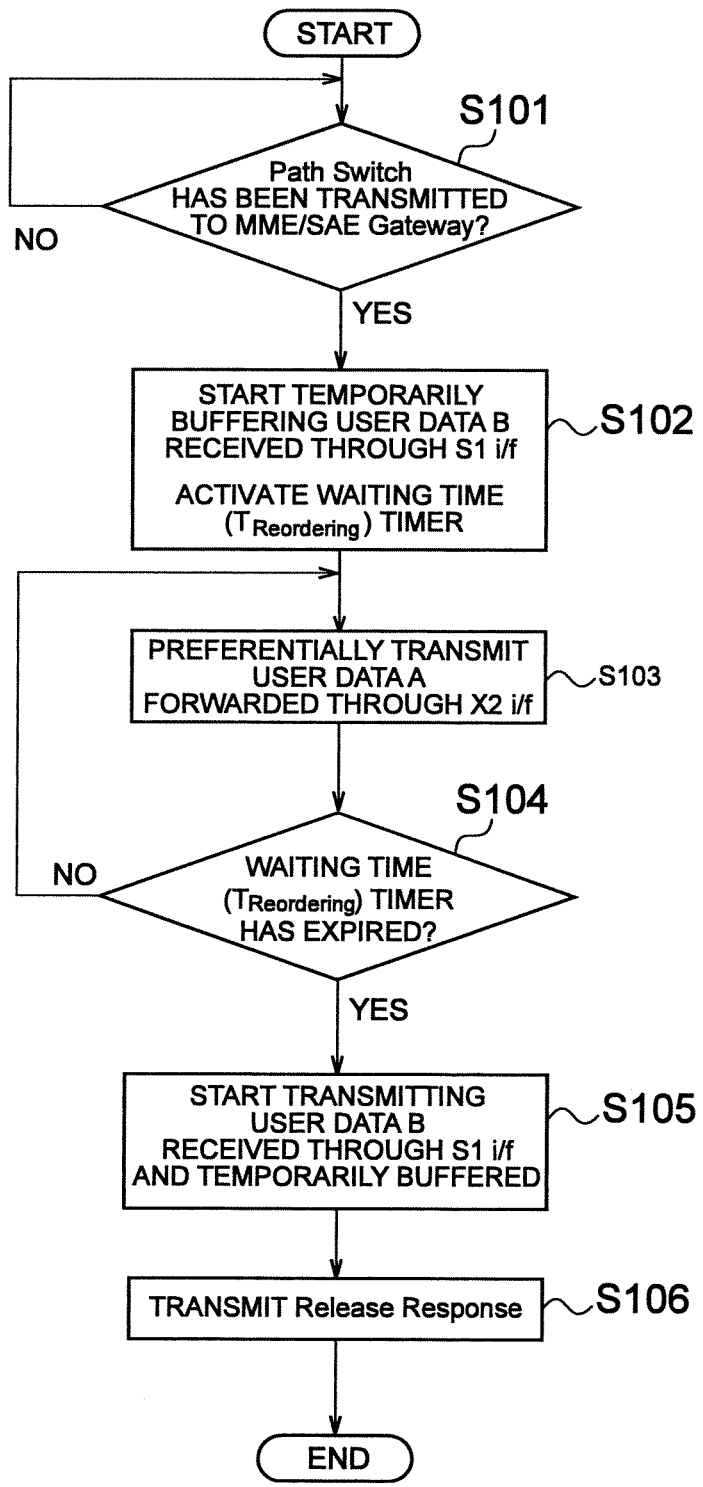
FIG. 8 is a sequence diagram showing an operation of the mobile communication system according to the first embodiment of the present invention.

As shown in FIG. 8, in Step S101, the handover-target radio base station eNB determines whether or not the handover-target radio base station eNB has transmitted a "Path Switch" message (or a "Handover Complete" message) to the path control apparatus MME/SAE Gateway to request a change of a path for forwarding user data, from the handover-source radio base station eNB to the handover-target radio base station eNB.

When having determined that the "Path Switch" message has been transmitted, in Step S102 the handover-target radio base station eNB, triggered by the transmission of the "Path Switch" message, starts temporary buffering of the user data B (second user data) received through the S1 interface (the access bearer between the handover-target radio base station eNB and the path control apparatus MME/SAE Gateway), and also activates the waiting-time ($T_{reordering}$) timer for the buffering.

In Step S103, while buffering the user data B (second user data) received through the S1 interface, the handover-target radio base station eNB transmits the user data A (first user data) forwarded from the handover-source radio base station eNB through the X2 interface, to the mobile station UE.

In Step S104, the handover-target radio base station eNB determines whether or not the preset waiting-time ($T_{reordering}$) timer has expired or not.

When the waiting-time ($T_{reordering}$) timer has not expired yet, the operation returns to Step S103, where the handover-target radio base station eNB forwards the user data A (first user data) received from the handover-source radio base station eNB through the X2 interface, to the mobile station UE.

When the waiting-time ($T_{reordering}$) timer has expired, in Step S105, the handover-target radio base station eNB stops the temporary buffering of the user data B (second user data), and starts forwarding the user data B (second user data) for the mobile station UE to the lower layer.

In Step S106, triggered by the expiration of the waiting-time ($T_{reordering}$) timer, the handover-target radio base station eNB transmits a "Release Resource" message to the handover-source radio base station eNB to request a release of the U-plane tunnel, set up on the X2 interface, for forwarding the user data.

Advantageous Effects of the Mobile Communication System According to the First Embodiment of the Present Invention The mobile communication system according to the first embodiment of the present invention can offer high quality communication because, when the mobile station UE performs handover processing, the handover-target radio base station eNB temporarily buffers the user data B (second user data) received through the S1 interface to thereby prevent order reversal of user data caused by forwarding of the user data A (first user data) from the handover-source radio base station eNB to the handover-target radio base station eNB.

The present invention has been described above using the embodiment given above. However, it is apparent to those skilled in the art that the present invention is not limited to the embodiment described herein. The present invention may be carried out as modified or corrected forms without departing from the spirit and scope of the present invention defined by the appended claims. Therefore, the description given herein is for illustrative purposes only and is not intended to limit the present invention whatsoever.

Note that the entire content of Japanese Patent Application No. 2007-071687 (filed on Mar. 19, 2007) is incorporated herein by reference.

INDUSTRIAL APPLICABILITY

As described above, the present invention can provide a handover method and a radio base station by which user data can be forwarded to the mobile station UE in correct order in handover processing by causing the handover-target radio base station eNB to temporarily store user data from the core node SAE Gateway and to preferentially forward user data transmitted from the handover-source radio base station eNB to the mobile station UE. The handover method and the radio base station are therefore useful in radio communications such as mobile communications.

The invention claimed is:

1. A handover method in which a mobile station performs processing for handover from a handover-source radio base station to a handover-target radio base station, the handover method comprising the steps of:
    forwarding, at the handover-source radio base station, first user data for the mobile station to the handover-target radio base station when it is determined that the handover processing is to be performed, the first user data being stored in the handover-source radio base station;
    forwarding, at the handover-target radio base station, the first user data to the mobile station;
    activating, at the handover-target radio base station, a predetermined timer when transmitting a "Handover Complete" message being a setup request for setting up an SAE access bearer and a "Path Switch" message being a path switch request to a path control apparatus to request switch of a path for forwarding user data, wherein the predetermined timer expires when the handover-target radio base station receives a "Handover Complete message ACK" from the path control apparatus; and storing second user data for the mobile station received from the path control apparatus until the predetermined timer expires, wherein the predetermined timer indicates how long to store the second user data;
    sending a release resource message to the handover-source radio base station after the predetermined timer expires; and
    forwarding, at the handover-target radio base station, the stored second user data to the mobile station after the release resource message is sent,
    wherein the predetermined timer is set individually for each QoS of the user data.

2. The handover method according to claim 1, wherein a U-plane tunnel established between the handover-source radio base station and the handover-target radio base station and used for user data forwarding is released after the predetermined timer expires.

3. A radio base station used in a mobile communication system in which a mobile station is configured to perform handover processing, the radio base station being configured to:
    receive first user data for the mobile station from a handover-source radio base station when it is determined that the handover processing is to be performed, the first user data being stored in the handover-source radio base station;
    forward the first user data to the mobile station;
    activate a predetermined timer when transmitting a "Handover Complete" message being a setup request for setting up an SAE access bearer and a "Path Switch" message being a path switch request to a path control apparatus to request switch of a path for forwarding user data, wherein the predetermined timer expires when the handover-target radio base station receives a "Handover Complete message ACK" from the path control apparatus; and store second user data for the mobile station received from the path control apparatus until the predetermined timer expires;

send a release resource message to the handover-source radio base station after the predetermined timer expires; and forward the stored second user data to the mobile station after the release resource message is sent, wherein the predetermined timer is set individually for each QoS of the user data.

4. The radio base station according to claim 3, wherein a U-plane tunnel established with the handover-source radio base station and used for user data forwarding is released after the predetermined timer expires.

* * * * *